UNITED STATES PATENT OFFICE.

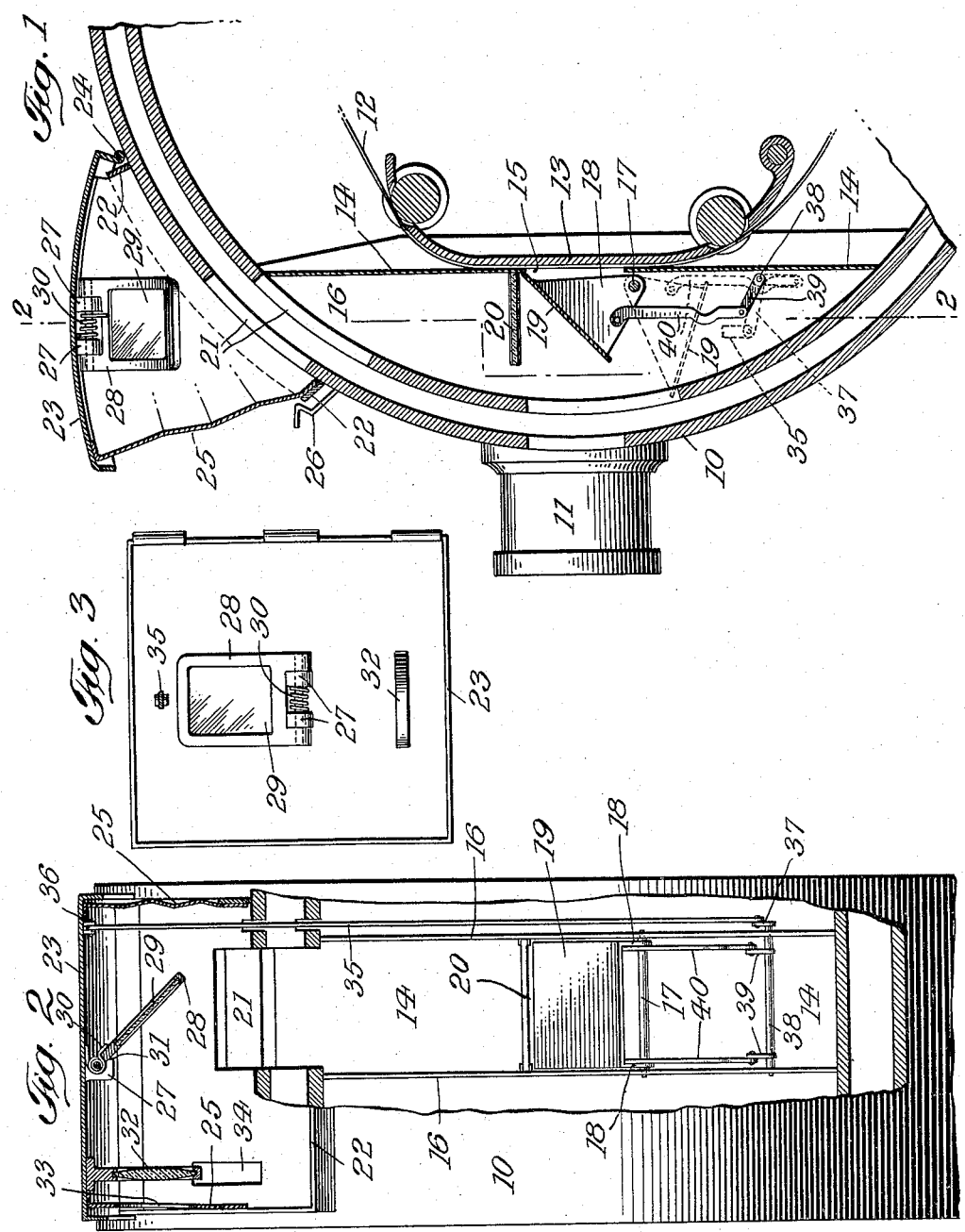

CARL E. AKELEY, OF NEW YORK, N. Y.

FINDING AND FOCUSING DEVICE FOR MOTION-PICTURE CAMERAS.

1,159,733. Specification of Letters Patent. Patented Nov. 9, 1915.

Application filed February 6, 1915. Serial No. 6,468.

*To all whom it may concern:*

Be it known that I, CARL E. AKELEY, a citizen of the United States, and residing in New York city, county and State of New York, have invented certain new and useful Improvements in Finding and Focusing Devices for Motion-Picture Cameras, of which the following is a specification.

This invention relates to a novel device for readily finding and focusing the objects to be photographed, which finding and focusing operation is carried out with the use of the same lens system that is subsequently employed for taking the actual pictures, the device being more particularly adapted to be used in conjunction with a motion picture camera such for instance, as shown and described in a copending patent application filed by me August 3rd, 1914, under Serial Number 854,777.

In the accompanying drawing:—Figure 1 is a section through part of a motion picture camera provided with my improved finding and focusing device; Fig. 2 a cross section on line 2—2, Fig. 1, and Fig. 3 an inner face view of the detached finding and focusing lid.

The numeral 10 indicates a circular camera casing provided with the usual lens tube or objective 11 for producing a series of pictures on an intermittently advanced film 12, although it is obvious that my improved finding and focusing device may also be applied to cameras of different constructions. The film 12 is shown to be supported opposite tube 11 by a stationary back 13 while a suitable light shield 14 apertured as at 15 protects those film portions that should not be met by the light rays. Shield 14 is provided with a pair of lateral flanges 16 in corresponding perforations of which is rotatably mounted a transverse spindle 17 carrying the rearwardly extending lugs 18 of a reflector 19. The latter is adapted to be swung sidewise into the position indicated by dotted lines in Fig. 1 so as to be entirely out of the path of the light rays passing through tube 11 while the film 12 is being exposed. In the position shown in full lines in Fig. 1 the reflector 19 is located in the path of the light rays and extends at an angle of 45° to the axis of tube 11. Sidewise of aperture 15 there is firmly secured to shield 14 a screen 20 such as a plate of matted or ground glass, said screen being arranged opposite reflector 19 when occupying the position shown in full lines in Fig. 1, and extending parallel to the axis of lens tube 11. It will thus be seen that in this position of reflector 19, the picture produced by the lenses of tube 11 will be thrown upon the screen 20 by the reflector 19. In order to produce a picture on the screen that corresponds in distinctness, etc., exactly to a picture received by the film 12 in case the reflector 19 occupies the position shown in dotted lines in Fig. 1, the distance between the center of the light-reflecting layer of reflector 19 and the sensitive coating of the film 12 should exactly equal the distance between said reflecting layer and the picture-receiving face of the screen. In order to enable the photographer to properly view from the exterior of the camera casing 10 an image thrown upon the screen 20 said casing is apertured as at 21 in alinement with the axis of said screen. Casing 10 is further provided with a rectangular outwardly extending flange or rim 22 which is adapted to be engaged by a similarly shaped flanged lid 23 pivoted at 24 to casing 10. Intermediate between rim 22 and lid 23 is interposed a collapsible bellows 25 in order to prevent the light from freely entering the camera casing whenever the lid is swung into its open position as illustrated in Figs. 1 and 2. When closed the lid 23 is held in place by a spring catch 26 or any other suitable means. To the lugs 27 projecting inwardly from the lid 23 is pivoted the frame 28 of a reflector 29. The latter is adapted to be folded against lid 23 while a spring 30 tends to swing the reflector away from the lid until the frame 28 engages corresponding abutments 31 of lugs 27, in which position reflector 29 extends at an angle of 45° to screen 20. Lid 23 is further provided with an inwardly extending magnifying lens 32 through which the image thrown from screen 20 upon reflector 29 may be viewed, the lens 32 being exposed to the eye of the photographer through a corresponding opening 33 of bellows 25. When the lid 23 is closed, the reflector 29 by engaging casing 10, will be folded against the lid while the lens 32 is accommodated within a corresponding pocket 34 of casing 10.

Means are also provided for automatically setting reflector 19 to the proper position for focusing or exposing according to the position of lid 23. These means are shown to consist of a rod 35 pivoted at one end to said lid as at 36 while its other end is fulcrumed to an arm 37 fast on a spindle 38 that is rotatably supported by the shield-flanges 16. To spindle 38 is firmly attached a pair of arms 39 connected by links 40 to the lugs 18 of reflector 19. It will be seen that whenever the lid 23 is opened for finding and focusing purposes, rod 35 will turn spindle 38 through arm 37 thereby swinging the arms 39 and the reflector 19 into the position shown in full lines in Fig. 1. Thus the picture produced by the lenses of tube 11 is, by reflector 19, thrown upon screen 20 and may be viewed by the photographer through opening 33, lens 32 and inclined reflector 29. After the camera has been properly focused, lid 23 is closed which movement is transmitted through rod 35 and arm 37 to spindle 38 whereby the latter is turned to swing reflector 19 into the position shown in dotted lines in Fig. 1, the camera being thus ready for exposing purposes.

It will be seen that by the construction described simple and effective means are provided for finding, focusing and exposing with the use of the same lens system. I desire it to be understood, however that I do not limit myself to the particular construction shown and described but that the same may be varied in several ways and will still come within the scope of the appended claims.

I claim:—

1. A finding and focusing device of the character described comprising a camera casing having an opening, an objective secured to said casing, a reflector inclosed within said casing and adapted to be brought in an inclined position into the path of the light rays passing through said objective, a screen also inclosed within said casing and extending at an angle to said reflector, a lid movably secured to the camera casing and adapted to close the casing-opening, means carried by said lid for permitting an observation of said screen, and means for operatively connecting the lid to the reflector to bring the reflector into its said inclined position.

2. A finding and focusing device of the character described comprising a camera casing having an opening, an objective secured to said casing, a reflector inclosed within said casing and adapted to be swung into the path of the light rays passing through said objective for finding and focusing and to be swung out of said path for exposing, a screen inclosed within the camera casing and adapted to receive a picture from said reflector, a lid movably connected to said casing, and adapted to close the casing-opening, means carried by said lid for permitting an observation of said screen, and means for operatively connecting the lid to the reflector whereby said swinging is accomplished.

3. A finding and focusing device of the character described, comprising a camera casing having an opening, an objective, a pivoted reflector inclosed within the casing and adapted to be swung into or out of the path of the light rays passing through said objective, a picture-receiving screen also inclosed within the casing, a lid hinged to the casing and adapted to close the casing-opening, an additional reflector and a lens carried by said lid, and means for operatively connecting said lid to the first named reflector whereby said swinging is accomplished.

4. A finding and focusing device of the character described, comprising a camera casing having an opening, an objective, a pivoted reflector inclosed within the casing and adapted to be swung into or out of the path of the light rays passing through said objective, a picture-receiving screen also inclosed within the casing, a lid hinged to the casing and adapted to close the casing-opening, an additional reflector and a lens carried by said lid, and a rod for operatively connecting the lid to the first named reflector whereby said swinging is accomplished.

5. A finding and focusing device of the character described, comprising a camera casing having an opening, an objective, a pivoted reflector inclosed within the casing and adapted to be swung into or out of the path of the light rays passing through said objective, a picture-receiving screen also inclosed within the casing, a lid hinged to the casing and adapted to close the casing-opening, an additional reflector and a lens carried by said lid, a rod pivoted to the lid, an arm fulcrumed to said rod, a spindle carrying said arm, and means for operatively connecting said spindle to the first named reflector.

6. A finding and focusing device of the character described comprising a camera casing having an opening, an objective, a pivoted reflector inclosed within the casing and adapted to be swung into or out of the path of the light rays passing through said objective, a picture-receiving screen also inclosed within the casing, a lid hinged to the casing and adapted to close the casing-opening, an additional reflector pivoted to the lid, a spring engaging said additional reflector, a magnifying lens firmly attached to the lid, and means for operatively connecting the lid to the first named reflector.

CARL E. AKELEY.

Witnesses:
ARTHUR E. ZUMPE,
IDA O. KRUMM.